United States Patent [19]

Peterhans et al.

[11] 4,107,100
[45] Aug. 15, 1978

[54] POROUS, SUBSTANTIALLY FOAM-FREE COMPOSITES

[75] Inventors: Josef Peterhans; Otto Volkert, both of Ludwigshafen; Wilhelm Friedrich Beckerle, Bobenheim-Roxheim, all of Fed. Rep. of Germany

[73] Assignee: BASF Wyandotte Corporation, Wyandotte, Mich.

[21] Appl. No.: 584,665

[22] Filed: Jun. 6, 1975

[30] Foreign Application Priority Data

Jun. 6, 1974 [DE] Fed. Rep. of Germany ....... 2427897

[51] Int. Cl.$^2$ ...................... C08G 18/10; C08G 18/14
[52] U.S. Cl. ................................. 521/137; 264/45.3; 428/423; 428/425; 521/159
[58] Field of Search ................... 260/2.5 AK, 2.5 BE, 260/2.5 AT, 29.2 TN; 264/45.3; 428/423, 425

[56] References Cited

U.S. PATENT DOCUMENTS

| | | | |
|---|---|---|---|
| 3,114,722 | 12/1963 | Einhorn | 260/2.5 AK |
| 3,238,156 | 3/1966 | Kohrn | 260/2.5 AK |
| 3,354,099 | 11/1967 | Stegeman | 260/2.5 AK |
| 3,505,275 | 4/1970 | Sato et al. | 260/29.2 TN |
| 3,663,469 | 5/1972 | Weissmahr | 260/2.5 AK |
| 3,798,186 | 3/1974 | Nakade et al. | 260/2.5 AK |
| 3,801,421 | 4/1974 | Allen et al. | 260/2.5 BE |
| 3,805,532 | 4/1974 | Kistner | 260/2.5 AK |

*Primary Examiner*—Eugene C. Rzucidlo
*Attorney, Agent, or Firm*—John W. Linkhauer; Bernhard R. Swick; Robert E. Dunn

[57] ABSTRACT

This invention deals with porous, substantially foam-free composite material of grainy solid material particles of a certain grain size, which is solidified with a binder mixture of isocyanate-group-containing prepolymers, water, and possibly auxiliaries, and the manufacture and application of such products.

5 Claims, No Drawings

POROUS, SUBSTANTIALLY FOAM-FREE COMPOSITES

DESCRIPTION OF THE INVENTION

It is a known fact that rigid foam objects can be manufactured in sufficiently stable forms, if discrete particles of a porous styrene polymer and an expandable mixture of polyols, di- and/or polyisocyanates and auxiliaries which react under formation of polyurethanes, are placed into a mold and are allowed to expand.

Combined, flexible foams can be produced of foamed olefin homo- and co-polymers and expandable polyurethane mixtures in such a manner that the expanded, flexible plastic particles are filled into a mold either loosely or as heat-sealed agglomerates. Into the resulting, interconnected hollow spaces the expandable polyurethane mixture is sprayed under pressure and the reaction mixture is allowed to foam. Such combination foams consist of a polyurethane foam skeleton, in which the foamed olefin polymer particles are embedded in a homogeneous distribution.

According to U.S. Pat. No. 3,114,722, polyurethane foams with embedded polymer particles are manufactured from crushed, foamed polymer particles, such as foamed particles of polyurethanes, butadiene-styrene latex, polyvinyl acetate, polyvinyl chloride and isocyanate-group-containing prepolymers with water-catalyst mixtures.

Foamed polymer particles which are manufactured by breaking up waste polymers, have irregularly formed, usually jagged, surfaces. Therefore, these particles easily hook into each other to form larger agglomerates. It is very dificult to mix this foam uniformly with the isocyanate-group-containing prepolymers. The foamed, molded objects therefore contain the foamed polymer particles in an extremely irregular distribution, so that the usage properties of such products vary greatly.

The state of the art further contains numerous processes for glueing various substrates using polyurethane prepolymers as binders. Numerous auxiliaries, such as reaction accelerators, stabilizers, solvents, pigments and others can be added to the prepolymer or the binder-substrate mixture. Such mixtures are solidified by adding low-molecular cross-linking agents, such as diamines, glycols and others or during an extended period of time under the influence of humidity. Under certain circumstances it would be advantageous to compress the substrate-binder mixture and allow it to harden under pressure. The disadvantages of this process are that the polyurethane prepolymers are relatively viscous or even solid, and that mixtures of grainy substrates and polyurethane prepolymers are next to impossible to process due to their viscosity and adhesiveness, and that they cannot be sufficiently and uniformly smoothed and compressed. In order to avoid these disadvantages it has been suggested to dilute the polyurethane prepolymers with inert solvents. In addition to the cost of the solvent, however, this only results in new difficulties. Thus volatile solvents, which are often toxic and frequently also pose a fire hazard, must be separated by evaporation, while the non-volatile solvents often remain in the hardened reaction mass and impair its stability. Another means of eliminating the described disadvantages was seen in diluting the polyurethane prepolymers with reactive solvents, such as e.g., multivalent alcohols, and to incorporate the solvent into the polyaddition product. The drawback of this method is the necessity of having to mix such two-component systems immediately before processing, since the mixing ratios must be maintained accurately. The mixture thus involves a higher processing risk and has a shorter pot-life. Furthermore, the free isocyanate groups can react with water under humid reaction conditions to such an extent that sufficient isocyanate groups are no longer present in the prepolymer to completely convert the reactive groups of the solvent. This can lead to insufficient stability properties or to an undesirable surface stickiness of the composites. Another disadvantage of the described process is that the binders or the substrate-binder mixtures are adhesive masses, which tend to adhere to the foam particles and thus inhibit the material flow and the processing.

A third, sometimes practiced alternative is the use of a prepolymer which contains more or less excess of a liquid, low-viscosity polyisocyanate, e.g., toluene diisocyanate. The drawback of such systems is considerable volatility of the low-molecular-weight isocyanate components, the vapors of which form a great health hazard.

The task solved by this invention is the elimination of the described drawbacks during the glueing of substrates with binders based on isocyanates, and the manufacture of composite materials in a simple manner from granulated solid particles, especially shredded waste rubber or rubber granulates.

This invention thus deals with porous, practically foam-free composites, which are characterized in that grainy solid particles with an average grain size of 0.1 to 20 millimeters are mixed and combined with
 a. 3 to 50 weight percent, relative to the weight of the solid particles, of an isocyanate-group-containing prepolymer;
 b. at least 20 weight percent water, relative to the weight of the isocyanate-group-containing prepolymer, and
 c. possibly auxiliaries.

Other objects of the present invention are: a process for the manufacture of porous, practically foam-free composites, which process is characterized in that the granulated solid particles with an average grain size of 0.1 to 20 millimeters are mixed with:
 a. 3 to 50 weight percent, relative to the weight of the solid particles, of an isocyanate-group-containing prepolymer;
 b. at least 20 weight percent water, relative to the weight of the isocyanate-group-containing prepolymer, and
 c. possibly auxiliaries,
and in that these mixtures are allowed to harden on a temporary or permanent substrate or in a mold, without incurring considerable foam formation, and in that these porous, substantially foam-free composite materials are used as covers or coatings for sporting or playing surfaces.

The composite materials according to this invention are porous. This porosity is obtained by an incomplete filling of the hollow spaces between the solid particles with the binder, so that the composite is largely permeated by a basically interconnected system of hollow spaces which are in contact with the atmosphere.

This system of hollow spaces is formed when the solid particles suited for manufacturing porous, substantially foam-free composites are of a certain grain size and are processed, at the described quantity ratios, with the mixtures of propolymers and water which form the binder. This system of hollow spaces is essential for the escape into the atmosphere of the carbon dioxide formed during the reaction of polyurethane propolymers with water. This escape process practically completely prevents a foaming of the substrate-binder mixture.

To what maximum binder component content, expressed by weight, these conditions are met, depends—in a particular individual case—in a very complex manner on the granulometry of the solid particles, the net density of the applied materials, and the degree of compression obtained from processing the mixture. Therefore an overall, numerical upper limit of the binder component, 50 or 30 weight percent relative to the weight of the solid particles, can only be a rough outline.

The formation of individual gas bubbles in polyurethane components connecting the solid particles of the composite material according to this invention cannot be completely eliminated; but it hardly influences the quality of the manufactured composite. It is of considerable importance, on the other hand, that the development of gas bubbles, even if it does take place, surprisingly remains limited to such a small extent that the hardening mass, even if it were free to expand, does not change its volume or does so barely perceptibly. It is in this sense that the repeatedly used term "substantially foam-free" is to be understood.

The porous, substantially foam-free composites according to the invention are manufactured, as already explained, of grainy solid particles and a mixture of binders consisting of isocyanate-group-containing prepolymers, water, and possibly auxiliaries.

Inorganic or organic particles with a grain size of 0.1 to 20 millimeters are considered granular solid particles. Those particles, however, where 80 percent, relative to the total weight of the particles, have a grain size of 0.5 to 10 millimeters are to be preferred.

The solid particles may consist, for example, of ceramic materials such as clay pieces, glass pieces, sand, or gravel, or of metal or plastic granulates. Shredded waste-rubber and/or rubber granulates are preferred.

The isocyanate-group-containing prepolymers for the binder mixtures are manufactured of di- and/or polyisocyanates and polyols. Aliphatic and/or preferably aromatic di- and/or polyisocyanates, such as isophoronediisocyanate, 4,4'-, 2,4'- and 2,2'-diisocyanato-diphenylmethane or the corresponding isomeric mixtures, 1,5-diisocyanato-naphthalene, polyphenyl-polymethylene-polyisocyanate, 2,4,6-triisocyanato-toluene, and preferably 2,4- or 2,6-diisocyanatotoluene and the corresponding commercial isomeric mixtures may be used.

Preferably there should be used as polyols polyether alcohols which are partially branched, branch-chained, or preferably linear. There will come under consideration polyether polyols which are manufactured by polyalkoxylation of water and/or multivalent, preferably bivalent alcohols, such as trimethylolpropane, glycerine, and preferably propylene glycol, and ethylene glycol with ethylene oxide and/or propylene oxide. Mixtures of various polyether polyols, e. g., those manufactured of alcohol mixtures by means of adding ethylene oxide and/or propylene oxide, may be used.

Suitable polyether polyols have molecular weights of 134 to 9000, preferably of 400 to 2000, and hydroxyl numbers of 12 to 830, preferably 55 to 280. For manufacturing the prepolymers, the polyols and polyisocyanates are brought to reaction according to familiar methods, in the presence of catalysts if needed, with reaction temperatures of 40° to 90° C., preferably between 60° and 80° C., in 30 minutes to 5 hours, preferably in 1 to 2 hours, in such quantitative ratios, that 1.5 to 15, preferably 2.5 to 8, equivalent isocyanate groups of the di- and/or polyisocyanate groups are present for each equivalent hydroxyl group of the polyols. In this manner prepolymers are obtained, which possibly contain excess polyisocyanate monomers, which have viscosities of 100 to 15,000 centipoises, preferably 400 to 5,000 centipoises, and which have NCO-contents of 3 to 30 weight percent, preferably 5 to 25 weight percent. To lower the viscosity and to improve the processability for some fields of application, it may be useful to dilute the isocyanate-group-containing prepolymers with additional monomeric di- and/or poly-isocyanates. This can be advantageous especially if prepolymers lacking in isocyanate groups are used.

Another important characteristic of this invention is that the binding mixture must have a water content of at least 20 weight percent, relative to the weight of the isocyanate-group-containing prepolymer, so that the mixtures can be processed well. Basically, there is no upper limit for added water. Thus reaction mixtures of granular solid particles and binder mixtures can be hardened with water into composite materials with high mechanical strength immediately after completing the mixing process. Water in excess of the hollow space volume between the binder-coated solid particles does not bring about any additional advantages. Generally, an added quantity of water from 20 to 150 weight percent, preferably 50 to 100 weight percent, relative to the weight of the isocyanate-group-containing prepolymers, is sufficient.

If the prepolymer also additionally contains excess, volatile polyisocyanate, such as the customary toluene diisocyanate, the added water according to this invention brings about the added advantage that the evaporation of polyisocyanate from the finished mixture into the atmosphere is practically non-existent. This can be detected easily by the almost total absence of the specific polyisocyanate odor. Thus a considerable health hazard for the personnel is eliminated, especially if these mixtures are applied on a large scale in closed rooms, such as sports arenas.

Surprisingly, it was noted, that the reaction mixture of substrate and isocyanate-group-containing prepolymers becomes much more manageable and hardly foams at all during the mixing and setting processes when water is added to this mixture. The processability can be further improved by adding water-soluble surfactants in quantities of approximately 0.05 to 5 weight percent, preferably 0.1 to 2 weight percent, relative to the weight of the water.

All those water-soluble surfactants come under consideration which are otherwise familiar as emulsifiers, wetting agents, or colloidally soluble polymers, whether they be anionic, cationic, or non-ionic. The alkaline salts of aliphatic carboxylic and sulfonic acids, polyalkylene oxide, preferably polyethylene oxide adducts of aliphatic or aromatic alcohols or amines, the alkaline or alkaline earth salts of the monosulfate esters of such polyalkylene oxide adducts, polyvinyl alcohol, polyacrylamide, polyvinylpyrrolidone, soluble starch, protein, such as casein or animal glue, cellulose derivatives such as methyl cellulose and others.

By adding water, thin water films are formed between the substrate grains coated with the isocyanate-group-containing prepolymer. These water layers act as sliding layers and thus improve the formability of the mixture. The formation of these water films is promoted by the addition of the surfactants, and their stability is increased at the same time. In a similar manner the water layers at the binder-air interface make possible an easier processing of the fresh mixture of substrate and binder at the surface while e. g. smoothing the surface, and prevent the mixture from adhering easily to the process equipment. The described water films do not cause a weakening of the composite material which is obtained through setting-up of the binder, but an increase in the stability can be observed, which may be explained by the easier and therefore more complete compression of the mass.

In addition to the already described surfactants, other auxiliaries may be added to the binder mixture. These include, e. g., catalysts and catalytic systems which accelerate the addition of the polyisocyanate, and especially the addition of water to the polyisocyanates (such as tertiary amines or organic tin compounds or mixtures of tertiary amines and organic metal compounds); agents which promote the isocyanate tri- and/or polymerization (such as tris-(1,3,5-dialkyl amino alkyl)-hexahydro-triazine and 2,4,6-tris-(dialkyl-aminoalkyl)-phenols); stabilizers; agents to retard hydrolysis; fungistats and bacteriostats; flame inhibitors; pigments; and dyes.

In detail, the porous, substantially foam-free composite materials according to this invention are manufactured as follows: The granular solid particles are intensively mixed with the binder mixture, which contains 3 to 50 weight percent, preferably 10 to 30 weight percent of an isocyanate-group-containing prepolymer, relative to the weight of the isocyanate-group-containing prepolymer, and possibly auxiliaries. The mixing takes place at temperatures of 0° to 80° C., preferably 0° to 40° C. After the mixing process is completed, the material is formed. In order to obtain composite products which are as mechanically stable as possible, it has proven advantageous to surface-coat the granular solid particles with the isocyanate-group-containing prepolymer by pre-mixing, and to add the water after this pre-mixing process, together with the surfactants. The other auxiliaries may be incorporated into the reaction mixture together with the water, or preferably, with the isocyanate-group-containing reaction mixture. The process described last is usually preferable.

We have already mentioned that the reaction mixtures of granular solid particles and the binder mixture for the manufacture of porous, substantially foam-free composites may be hardened on a temporary or permanent substrate or in a mold. A fine-mesh sieve or a perforated sheet serves well as a temporary substrate. Molds should be constructed in such a manner that their walls are rigidly connected to a sieve or perforated bottom, so that excess water may run off or can be separated from the binder mixture in a simple manner. Permanent substrates may include, e. g., metal, wood, asphalt, and concrete boards or plates, or plastic foils. It is also possible to coat larger surfaces, e. g., substrates of asphalt, sub-flooring, concrete, wood, etc., on location with the described reaction mixture.

Depending on the density of the solid particles, the porous, substantially foam-free composite materials have a net specific weight of 0.2 to 2.0 and are thus suited for construction materials, intermediate layers for composite elements, coatings and flooring.

The composite materials made of shredded waste rubber and/or rubber granulates according to the invention are elastic and have a good recovery. These products are used as coatings for sporting and playing surfaces, as elastic sports surfaces, and as lining and insulating materials.

The parts mentioned in the examples are parts by weight.

EXAMPLE 1

Manufacture of the isocyanate-group-containing prepolymer:

To 522 parts of a mixture of 2,4- and 2,6-toluene diisocyanate with a weight-ratio of 80:20, 1500 parts of polypropylene oxide are added under continuous stirring at 80° C. under nitrogen within a 30-minute period. The polypropylene oxide should have an OH-number of 112 and a molecular weight of 1000. One hour prior to adding the polypropylene oxide to the above mixture, the polypropylene oxide was mixed with 0.15 parts of benzoyl chloride. In order to complete the conversion, the mixture is subsequently stirred for another 2.5 hours at 80° C., after which process it is cooled to room temperature. The obtained isocyanate-group-containing prepolymer has a content of free NCO-groups of 5.8 percent and a viscosity of 12 pascals-seconds.

While stirring, 600 grams of a mixture of rubber granulate with grain fractions of 1 to 3 millimeters and 3 to 5 millimeters in a weight ratio of 1:1 and 0.6 grams stannous octoate are added to 120 gram of the above-mentioned isocyanate-group-containing prepolymer. After 2 minutes, a solution of 120 grams water and 2 grams of a 20 weight percent aqueous solution of a polyaddition product of 25 moles ethylene oxide and 1 mole isooctylphenol is added to the rubber granulate coated with the prepolymer, and this mixture is stirred for another minute until complete mixing is achieved. Subsequently, the well-workable reaction mixture is filled into a flat metal mold with a sieve bottom (dimensions 30 × 20 × 1.5 centimeters), is well compressed and smoothed in this form, and is allowed to harden for 12 hours at room temperature. After being removed from the form, the porous, substantially foam-free composite is dried in air for a period of 6 days and is then cut into 5 centimeter wide strips in order to test the tensile strength. With a free (unsupported) clamped length of 5 centimeters and a breaking speed of 15 centimeters per minute, the tensile strength was 38 Newtons per square centimeter.

COMPARISON EXAMPLE

If we proceed corresponding to the outline given in Example 1, but do not add a solution of water and a surfactant to the prepolymer coated rubber granulate, we obtain a reaction mixture which is so viscous and sticky that it is almost impossible to work it. It is definitely impossible to compress the mass sufficiently and uniformly and to smooth it out.

EXAMPLE 2

Manufacture of the isocyanate-group-containing prepolymer;

To 790 parts of a mixture of 2,4- and 2,6-toluene diisocyanate with a weight ratio of 80:20, 1,500 parts of polypropylene oxide are added under continuous stirring at 80° C. under nitrogen within a 40-minute period.

The polypropylene oxide should have an OH-number of 112 and a molecular weight of 1000. One hour prior to adding the polypropylene oxide to the above mixture, it was mixed with 0.15 parts of benzoyl chloride. In order to complete the conversion, the mixture is subsequently stirred for another 2 hours at 80° C., after which the formed prepolymer is cooled to room temperature. The obtained product has a content of free NCO-groups of 11.0 percent and a viscosity of 2.8 pascals-seconds.

While stirring, 600 grams of a mixture of rubber granulate with grain fractions of 1 to 3 millimeters and 3 to 5 millimeters in a weight-ratio of 1:1 and 0.6 grams of stannous octoate are added to 120 grams of the above-mentioned isocyanate-group-containing prepolymer. After two minutes, a solution of 85 grams water and 5 grams of a 30 weight percent aqueous solution of a copolymer of 66 weight percent N-vinylpyrrolidone and 34 weight percent vinyl propionate is added to the rubber granulate coated with the prepolymer, and this mixture is stirred for another minute until a thorough mixing effect is achieved. Subsequently the well-workable reaction mixture is formed corresponding with the instructions given in Example 1, and is tested. The thus produced, porous, substantially foamfree composite has a tensile strength of 71 Newtons per square centimeter.

EXAMPLE 3

Manufacture of the isocyanate-group-containing prepolymer:

To 1309 parts of a 60° C. mixture of 2,4- and 2,6-toluene diisocyanate in the weight ratio of 80:20, 1,000 parts of polypropylene oxide are added under continuous stirring at a temperature below 90° C. under nitrogen within a period of 45 minutes. The polypropylene oxide should have an OH-number of 280 and a molecular weight of 400. Prior to adding the polypropylene to the above mixture, the polypropylene oxide was mixed with 0.1 part of benzoyl chloride.

In order to complete this conversion, the reaction mixture is stirred for another 2 hours at 85° C., and the finished prepolymer is subsequently cooled to room temperature. The obtained product has a content of free NCO-groups of 18.8 percent and a viscosity of approximately 5 pascal-seconds.

Corresponding with the instructions in Example 1, the composite material is manufactured from 120 grams of the above referred prepolymer and 600 grams of the rubber granulate. The prepolymer-coated rubber granulate is mixed with a solution of 90 grams water and 2 grams of a 20 weight percent aqueous solution of a poly-addition product consisting of 25 moles ethylene oxide and 1 mole isooctylphenol. This well-workable reaction mixture results in composite material having a tensile strength of 35 Newtons per square centimeter.

We claim:

1. Porous substantially foam-free composite material, characterized in that granular solid particles of shredded waste-rubber and/or rubber granulates with an averge grain size of 0.1 to 20 millimeters are mixed with
    (a) 3 to 50 weight percent of an isocyanate-group-containing prepolymer, relative to the weight of the solid particles; and then with
    (b) at least 20 weight percent water, relative to the weight of the isocyanate-group-containing prepolymer, and the reaction mixture thereby produced is permitted to harden.

2. Porous, practically foam-free composite materials according to claim 1, characterized in that the granular solid particles consist of shredded granulates of rubber.

3. Porous, substantially foam-free composite materials according to claim 1, characterized in that said water contains water-soluble surfactants in solution.

4. Porous, substantially foam-free composite material according to claim 1 as a cover or coating for sporting or playing surfaces.

5. Process for the manufacture of porous substantially foam-free composite materials, characterized in that granular solid particles of shredded waste-rubber and/or rubber granulates with an average particle size of 0.1 to 20 millimeters are mixed with
    (a) 3 to 50 weight percent, relative to the weight of the solid particles of an isocyanate-group-containing prepolymer compound, and then with
    (b) at least 20 weight percent water, relative to the weight of the isocyanate-group-containing prepolymer, and in that this mixture is allowed to harden on a substrate under conditions excluding perceivable foam formation.

* * * * *